(12) United States Patent
Jarstad (10) Patent No.: US 6,328,292 B1
(45) Date of Patent: Dec. 11, 2001

(54) ADJUSTABLE PNEUMATIC SPRING

(76) Inventor: Scott Conrad Jarstad, 1335 Summertime Trail, Lewisville, TX (US) 75067

( * ) Notice: Subject to any disclaimer, the term of this patent is extended or adjusted under 35 U.S.C. 154(b) by 0 days.

(21) Appl. No.: 09/491,465

(22) Filed: Jan. 26, 2000

(51) Int. Cl.[7] ........................................................ F16F 9/04
(52) U.S. Cl. ................................... 267/64.21; 267/64.19; 267/64.23; 267/64.27
(58) Field of Search ............................. 267/64.11, 64.15, 267/64.16, 64.19, 64.21, 64.23, 64.27, 64.28

(56) References Cited

U.S. PATENT DOCUMENTS

| | | | |
|---|---|---|---|
| 4,666,135 | * | 5/1987 | Buma ................................. 267/64.21 |
| 4,796,870 | * | 1/1989 | Hoffman ................................. 267/35 |
| 5,634,652 | | 6/1997 | Tsai . |
| 5,667,234 | | 9/1997 | Zirk et al. . |
| 5,725,226 | | 3/1998 | Cabrerizo-Pariente . |
| 5,829,773 | | 11/1998 | Rajaee . |

* cited by examiner

Primary Examiner—Christopher P. Schwartz
Assistant Examiner—C. T. Bartz
(74) Attorney, Agent, or Firm—Michael I Kroll (57) ABSTRACT

The present invention 10 disclosed a shock-absorbing member for attachment to the frame 18 of a bike 12. The variable resistance pneumatic spring is mounted on an existing coil spring shock body 56 comprising a cylindrical, substantially vertical body having a threaded exterior 24 to accept a spring preload adjuster nut 32, a central recess to receive a strut 62 into the superior end and a means 64 for attachment to the wheel assembly or bicycle frame 18 on the inferior end. The strut 62 has a first end slidably secured within the central recess of the body member 56 and a second end with a means 66 for attachment to the bicycle frame 18 assembly or to the wheel assembly. The progression cone 22 slides over the body member 56 and is held in place by the preload adjustment nut 32, the progression cone 22 being substantially cylindrical with a conical upper portion 34. The substantially hollow cylindrical pressure casing 30 has a greater diameter than the body member and includes a rubber seal 28 that extends beyond the casing's lower, open end before looping back upward and over the lip of the progression cone 22 and culminating in a central compression seal 26 with an interior diameter equal to the exterior diameter of the body member 56. A pair of retaining plates 36, 40 secures the top of the outer casing to the bicycle frame assembly 44 and a valve assembly 44 regulates the intake and discharge of gas 50 to the pressure chamber 46 formed by the interior of the outer casing 30, gasket 28 and retaining plates 36, 40.

8 Claims, 10 Drawing Sheets

ADJUSTABLE PNEUMATIC SPRING

BACKGROUND OF THE INVENTION

1. Field of the Invention

The present invention relates generally to shock absorbers and, more specifically, to a pneumatic spring system for bicycles that could be used to retrofit an existing coil suspension system or could be installed as an independent unit. Irregularities on a riding surface cause destructive vibrations that reverberate throughout the bicycle's structure and promote wear and tear on the bicycle while causing discomfort and contributing to cyclist injuries. The proliferation of mountain biking and BMX racing has necessitated incorporating shock dissipation systems to absorb the force incurred by the wheels impacting the ground. These shock dissipation systems are usually contained within the wheel fork members thus minimizing the force of impact that is retained by the bicycle frame, including the handlebars which are in direct contact with the rider. These shock absorbers include coil based spring systems, gas-impregnated rubber, leaf springs, and compressed air among others.

The present invention overcomes the shortcomings of the prior art by introducing an adjustable pneumatic spring shock absorber with a tunable position sensitive spring rate for bicycles which could be selectively pressurized by an air compressor or by a hand pump to accommodate various riding conditions. The variable resistance pneumatic spring is mounted on an existing coil spring shock body comprising a cylindrical, substantially vertical body having a threaded exterior to accept a spring preload adjuster nut, a central recess to receive a strut into the superior end and a means for attachment to the wheel assembly or bicycle frame on the inferior end; a strut with a first end slidably secured within the central recess of the body member and a second end with a means for attachment to the bicycle frame assembly or to the wheel assembly; a progression cone that slides over the body member and is held in place by the preload adjustment nut, said progression cone being substantially cylindrical with a conical upper portion; a substantially hollow cylindrical pressure casing of a greater diameter than the body member and including a latex rubber seal that extends beyond the casing's lower, open end before looping back upward and over the lip of the progression cone and culminating in a central compression seal with an interior diameter equal to the exterior diameter of the body member; a pair of retaining plates that secures the top of the outer casing to the bicycle frame assembly; and a valve assembly to regulate the intake and discharge of gas to the pressure chamber formed by the interior of the outer casing, gasket and retaining plates.

The installation of the variable resistance pneumatic spring device requires the removal of the spring retainer and the coil spring from the bicycle's existing shock absorber. The progression cone is then placed over the shock absorber body and rests on the spring preload adjustment nut. The pressure casing is then inserted over the body and the compression seal is placed around the body member in the graduated recess formed by the diagonal lineation of the mouth of the progression cone as it abducts from the body member. As the rubber gasket material progresses from the compression ring it passes over the mouth of the progression cone before looping up to bear against the interior wall of the pressure casing. The lower retaining plate is placed over the strut on the superior end of the pressure casing and the upper retaining plate is fastened to the lower retaining plate sandwiching the rubber seal and forming a hermetically sealed pressure chamber within the pressure casing. A valve mechanism is attached to the upper retaining plate with access to the pressure chamber. A pressurization source such as an air compressor or bicycle pump is used to pressurize the pressure chamber, as needed depending upon how much cushion is desired. The pressurization of the chamber forces the compression seal into the graduated recess formed between the mouth of the progression cone and the shock body to create a tighter seal as the pressure within the chamber increases. When the pressure effected upon the wheel is greater than that within the chamber, the shock body is forced into the pressure chamber thereby further compressing the air sealed within said chamber. The shock body travels into the pressure casing and the rubber gasket rolls between the progression cone and the pressure casing to form a pocket inferior to the exterior flared portion of the progression. The pocket grows progressively larger as the progression cone moves further into said casing and displaces compressed air from the chamber into the resulting lower pocket via the narrow channel between the gasket at the widest point of the progression cone and the gasket alongside the pressure casing. The displaced air is forced back into the chamber as the load on the wheel member is decreased.

2. Description of the Prior Art

There are other suspension device designed for bicycles. Typical of these is U.S. Pat. No. 5,829,773 issued to Babak Rajace on Nov. 3, 1998.

Another patent was issued to Antonio Cabrerizo-Pariente et al. on Mar. 10, 1998 as U.S. Pat. No. 5,725,226. Yet another U.S. Pat. No. 5,667,234 was issued to Wolfgang Zirk on Sept. 16, 1999 and still yet another was issued on Jun. 3, 1997 to Chin-Sung Tsai as U,S, Pat. No. 5,634,652.

Pat. No. 5.829,773

Inventor: Babak Rajace

Issued: Nov. 3, 1998

A modular telescopic front fork which is adaptable to a wide range of applications is disclosed. The modular telescopic front fork assembly is utilized for a front of a vehicle having at least one front wheel. The modular telescopic front fork assembly includes a removable self-contained damper cartridge. This removable self-contained damper cartridge includes a housing and a reciprocating piston rod axially extending from the housing. A first securing mechanism steerably secures the housing of the self-contained damper cartridge to the front of the vehicle. A second securing mechanism secures the piston rod of the self-contained damper cartridge assembly to the front wheel of the vehicle. This provides a removable self-contained damper cartridge which damps the movement of the front wheel relative to the vehicle.

U.S. Pat. No. 5,725,226

Inventor: Antonio Cabrerizo-Pariente

Issued: Mar. 10, 1998

A fork capable of absorbing the vibrations produced by the irregularities of the ground where a bicycle travels. In this way, vibrations do not end up being transmitted to the bicyclist's hands and arms, which is an advantage over conventional bicycles having rigid forks. The fork includes in each one of its two vertical arms or branches a shock absorber that comprises a group of elements that operates by means of oil and a gaseous fluid chamber. The fork includes a mechanical blocking system whose structure and functioning are very simple.

U.S. Pat. No. 5.634,652

Inventor: Chin-Sung Tsai

Issued: Jun. 3, 1997

A suspension member for a bicycle is set forth which includes a strut telescopically received into a cylinder. A head assembly extends from the cylinder through a piston defined at the end of the strut and into the strut. Mounted to the assembly is a valve member which forms between it and the piston a volume which increases and decreases as the suspension telescopes. In response to a bump, the suspension collapses against a bias. The bias urges the member to rebound. When rebounding the valve member acts to define a restriction to exhaust air from the volume to dampen removed. Also set forth are elastomer pads and couplers which can be removed from the suspension member as a unit for replacement.

While these bicycle suspension devices may be suitable for the purposes for which they were designed, they would not be as suitable for the purposes of the present invention, as hereinafter described.

SUMMARY OF THE PRESENT INVENTION

The present invention disclosed a shock-absorbing member for attachment to the frame of a bike. The variable resistance pneumatic spring is mounted on an existing coil spring shock body comprising a cylindrical, substantially vertical body having a threaded exterior to accept a spring preload adjuster nut, a central recess to receive a strut into the superior end and a means for attachment to the wheel assembly or bicycle frame on the inferior end. The strut has a first end slidably secured within the central recess of the body member and a second end with a means for attachment to the bicycle frame assembly or to the wheel assembly, along with a progression cone that slides over the body member and is held in place by the preload adjustment nut, the progression cone being substantially cylindrical with a conical upper portion. A substantially hollow cylindrical pressure casing of a greater diameter than the body member and including a latex rubber seal extends beyond the casing's lower, open end before looping back upward and over the lip of the progression cone and culminating in a central compression seal with an interior diameter equal to the exterior diameter of the body member. A pair of retaining plates secures the top of the outer casing to the bicycle frame assembly and a valve assembly regulates the intake and discharge of gas to the pressure chamber formed by the interior of the outer casing, gasket and retaining plates.

A primary object of the present invention is to provide a variable resistance pneumatic spring device for bicycles that could be pressurized to specific PSI to provide the proper amount of sag in the suspension depending on the weight of the rider.

Another object of the present invention is to provide a variable resistance pneumatic spring device for bicycles which utilizes a rolling gasket which creates a lower pocket to receive the displaced air and increases in size as the shock body travels into the pressure chamber and the chamber volume decreases.

Yet another object of the present invention is to provide a variable resistance pneumatic spring device for bicycles that can be used to retro fit existing coil spring shock absorbers or could be installed as a complete independent unit.

Yet another object of the present invention is to provide a variable resistance pneumatic spring device for bicycles that utilizes the compressed air within the piston to force a compression seal down between the body member and into the flared mouth of the progression cone thereby forming a seal that becomes tighter as the pressure within the chamber increases.

Still yet another object of the present invention is to provide a variable resistance pneumatic spring device for bicycles which includes a valve to allow for air intake and discharge and pressurization by either an air compressor or a hand pump if a rider wishes to make adjustments while on the road.

Yet another object of the present invention is to provide a variable resistance pneumatic spring device for bicycles that is lighter in weight and more versatile than traditional coil springs. Another object is to provide a rider a means to change the progression rate of the spring independent of the air pressure by installing a progression cone of a different size and shape. Yet another object is to provide an air spring which has no friction between the outer pressure casing (cylinder) and piston during compression and rebound.

Additional objects of the present invention will appear as the description proceeds.

The present invention overcomes the shortcomings of the prior art by providing an inexpensive, lightweight means for retrofitting an existing bicycle shock absorber as a pneumatic spring device that delivers a more consistent damping effect by utilizing compressed air provided by an air compressor or hand pump and a rolling gasket that is substantially cylindrical with a first recess on the upper end and a second, smaller recess on the lower end resulting in a compression seal. The gasket edge formed by the first recess is sandwiched between the two retainer plates located on the top of the pressure casing and extends down the interior of the casing before looping up and over the flared mouth of the progression cone where the compression seal is placed over the shock body and into the mouth of the progression cone to form a hermetic seal.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 2 is a sectional side plan of the present invention. Shown is the progression cone placed over the shock absorber body and resting on the spring preload adjustment nut. The pressure casing is inserted over the strut and the compression ring is placed around the body member in the graduated recess formed by the diagonal lineation of the mouth of the progression cone as it recedes from the body member. As the rubber gasket material progresses from the compression ring it passes over the mouth of the progression cone before looping up to bear against the interior wall of the pressure casing and is received by the retaining plates on top of the pressure casing. The resulting loop creates a lower displacement pocket to receive compressed air during damping. The lower retaining plate is placed over the strut and onto the superior end of the pressure casing and the upper retaining plate is fastened to the lower retaining plate sandwiching the rubber seal and forming a hermetically sealed pressure chamber within the pressure casing. A valve mechanism is attached to the upper retaining plate with access to the pressure chamber to allow for pressure control.

FIG. 6 is a side view of the present invention in use. Shown is a side view of the of an adjustable pneumatic spring assembly with force being applied from the wheel assembly. The pressurization of the chamber forces the compression seal into the graduated recess formed between the mouth of the progression cone and the shock body to create a tighter seal as the pressure within the chamber increases. When the pressure effected upon the wheel is greater than that within the chamber, the shock body is forced into the pressure chamber thereby further compressing the air sealed within said chamber. The shock body travels into the pressure casing and the rubber gasket rolls between the progression cone and the pressure casing to form a pocket inferior to the exterior flared portion of the progression. The pocket is growing progressively larger as the progression cone moves further into said casing and displaces compressed air from the chamber into the resulting lower pocket via the narrow channel between the gasket at the widest point of the progression cone and the gasket alongside the pressure casing.

LIST OF REFERENCE NUMERALS

With regard to reference numerals used, the following numbering is used throughout the drawings.
10 present invention
12 bike
14 rear suspension
16 pivot
18 frame
20 rear wheel
22 progression cone
24 threaded shock body
26 compression seal
28 gasket
30 pressure cylinder
32 preload adjustment nut
34 mouth of progression cone
36 lower retaining plates
38 displacement pocket
40 upper retaining plate
42 fastener
44 valve mechanism
46 pressure chamber
48 hand
50 pressurized air
52 air compressor line
54 graduated recess
56 shock body
58 atmospheric air
60 air inlet
62 strut
64 means for attachment
66 means for attachment
68 channel 70 bumper
72 direction arrow
74 upper edge of gasket
76 air inlet valve

DESCRIPTION OF THE PREFERRED EMBODIMENT(S)

In order that the invention may be more fully understood, it will now be described, by way of example, with reference to the accompanying drawings in which FIGS. 1 through 10 illustrate the present invention being an adjustable pneumatic spring for a bicycle.

Figure 1:
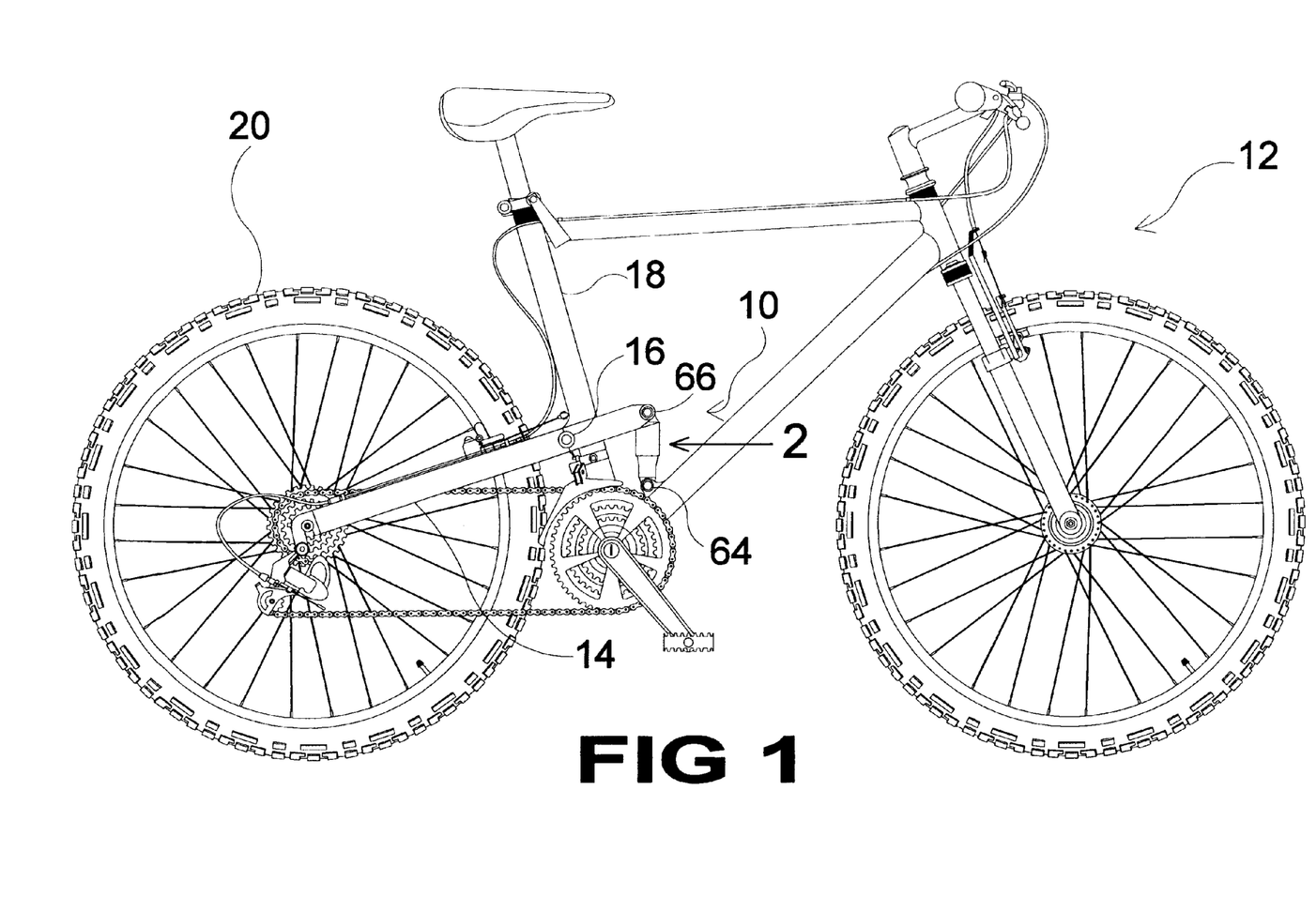
FIG. 1 is a side view of a mountain bike with rear suspension utilizing the present invention as the damping mechanism. When a load is placed on the rear wheel assembly the rear wheel assembly pivots on a fulcrum attached to the frame and allows the rear wheel to move upward independently from the frame and place the load on the present invention where it is dissipated.

Turning to FIG. 1, shown therein is a side view of a mountain bike 12 with rear suspension 14 utilizing the present invention 10 as the damping mechanism. When a load is placed on the rear wheel assembly 14 the rear wheel assembly pivots on a fulcrum 16 attached to the frame 18 and allows the rear wheel 20 to move upward independently from the frame 18 and place the load on the present invention 10 where it is dissipated. Means 64, 66 for attaching the present invention 10 are provided.

Figure 2:
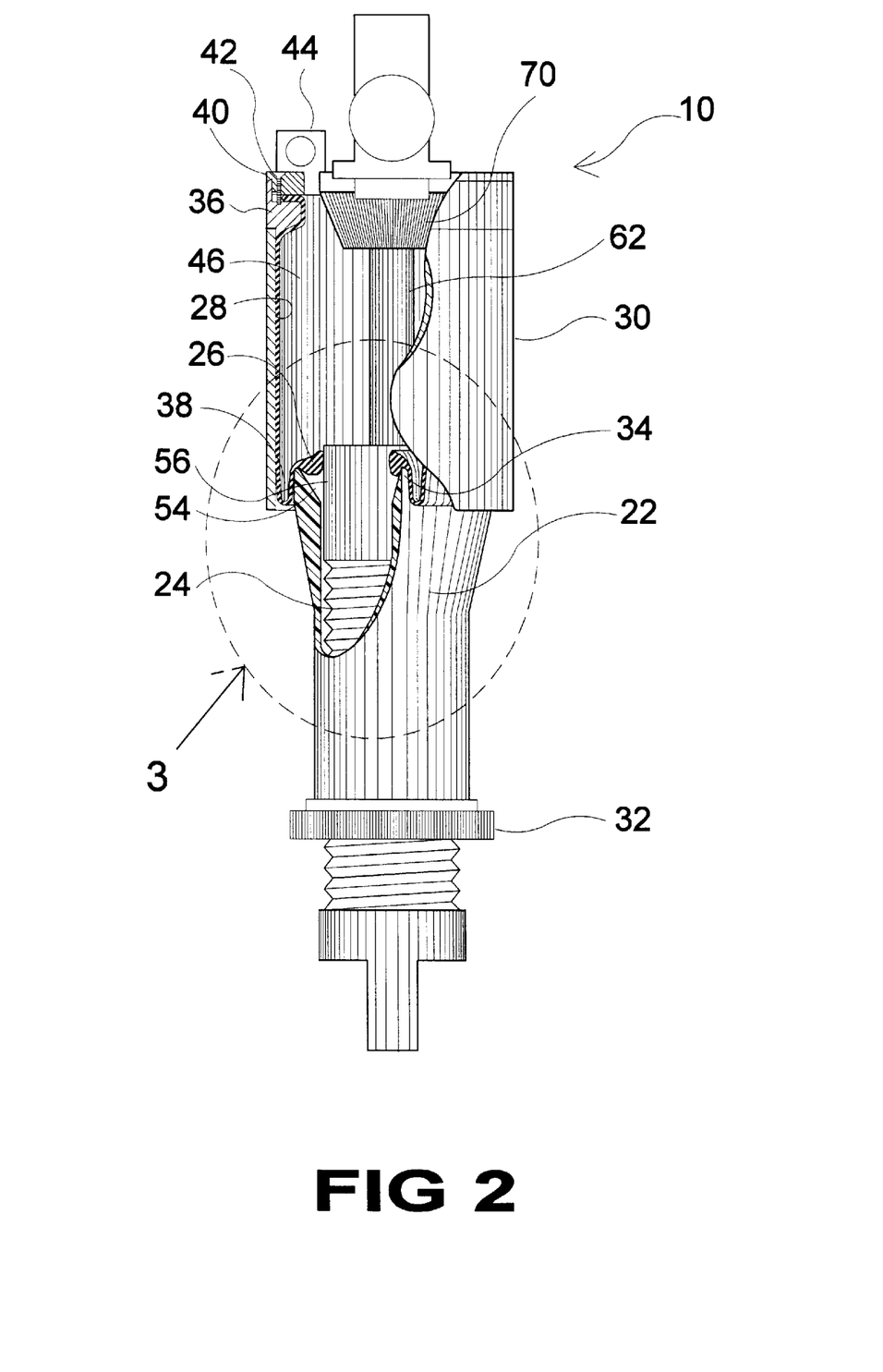

Turning to FIG. 2, shown therein is a sectional side plan of the present invention 10 showing a generally upright standing central body member 56 which has a shock absorber mechanism (not shown) disposed on its interior. Shown is the progression cone 22 placed over the threaded shock absorber body 24 and resting on the spring preload adjustment nut 32 which mates with threaded body 24. The pressure casing 30 is inserted over the strut 62 and the compression ring 26 is placed around the shock body member 56 in the graduated recess 54 formed by the diagonal lineation of the mouth 34 of the progression cone 22 as it recedes from the body member 56. As the rubber gasket material 28 progresses from the compression ring it passes over the mouth 34 of the progression cone 22 before looping up to bear against the interior wall of the pressure casing 30 and is received by the retaining plates 36, 40 on top of the pressure casing 30. The resulting loop in gasket 28 creates a lower displacement pocket 38 to receive compressed air during pneumatic damping. The lower retaining plate 36 is placed over the strut and onto the superior end of the pressure casing 30 and the upper retaining plate 40 is fastened at 42 to the lower retaining plate 36 sandwiching the rubber seal 28 and forming a hermetically sealed pressure chamber 46 within the pressure casing 30. A valve mechanism 44 is attached to the upper retaining plate 40 with access to the pressure chamber 46 to allow for an air inlet to chamber 46 for air pressure control. A rubber bumper 70 is shown at the top of strut 62.

Figure 3:
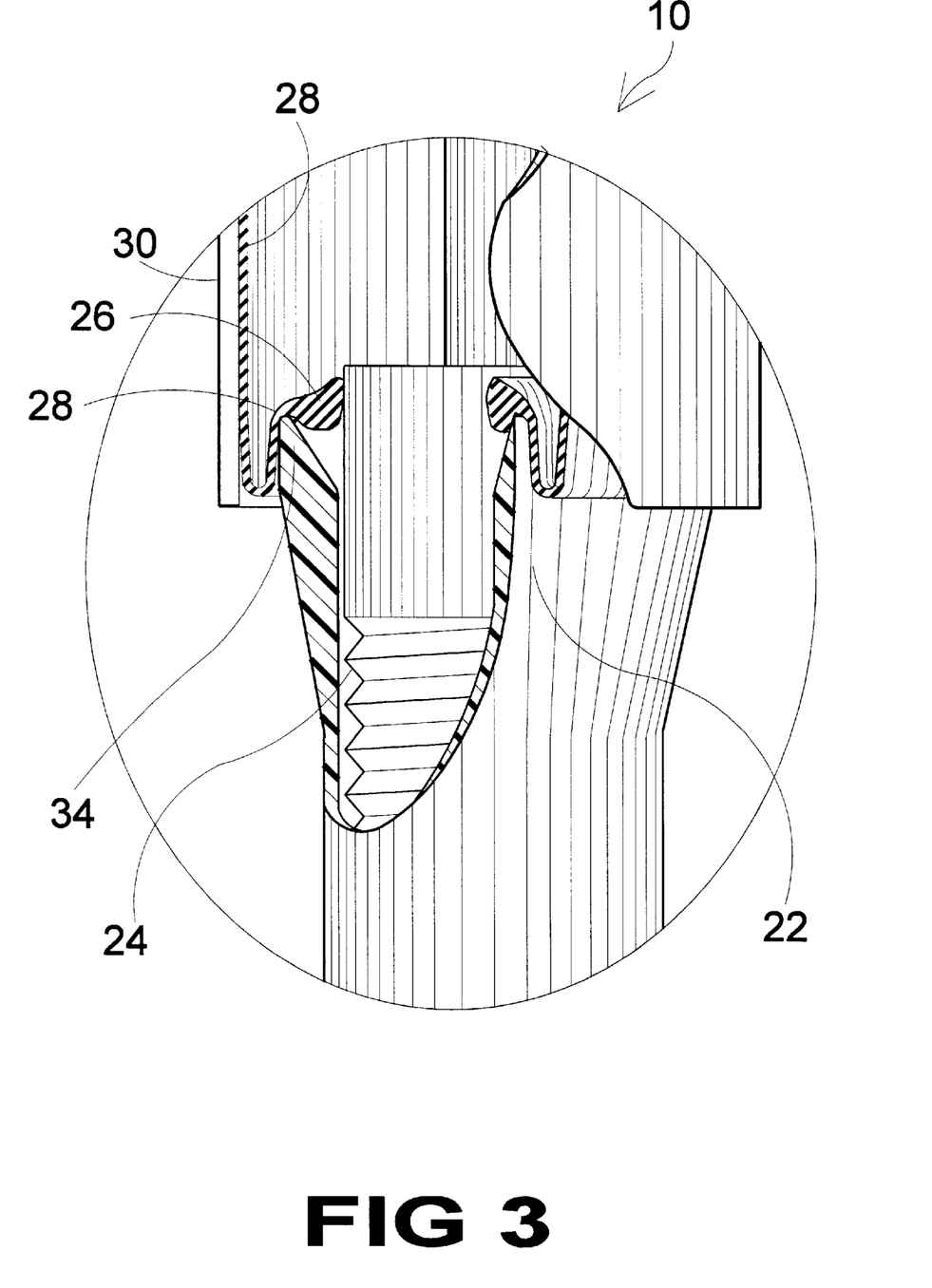
FIG. 3 is a detailed sectional view of the present invention as indicated in FIG. 2. Shown is the progression cone placed over the threaded shock body. The compression seal is fitted into the mouth of the progression cone and the gasket extends from the compression seal over the progression cone and down before looping up and alongside the interior wall of the pressure cylinder.

Turning to FIG. 3, shown therein is a detailed sectional view of the present invention 10 as indicated in FIG. 2. Shown is the progression cone 22 placed over the threaded shock body 24. The compression seal 26 is fitted into the mouth 34 of the progression cone 22 and the rubber gasket 28, e.g., latex rubber, extends from the compression seal 26 over the progression cone mouth 34 and down before looping up and alongside the interior wall of the pressure cylinder 30.

Figure 4:
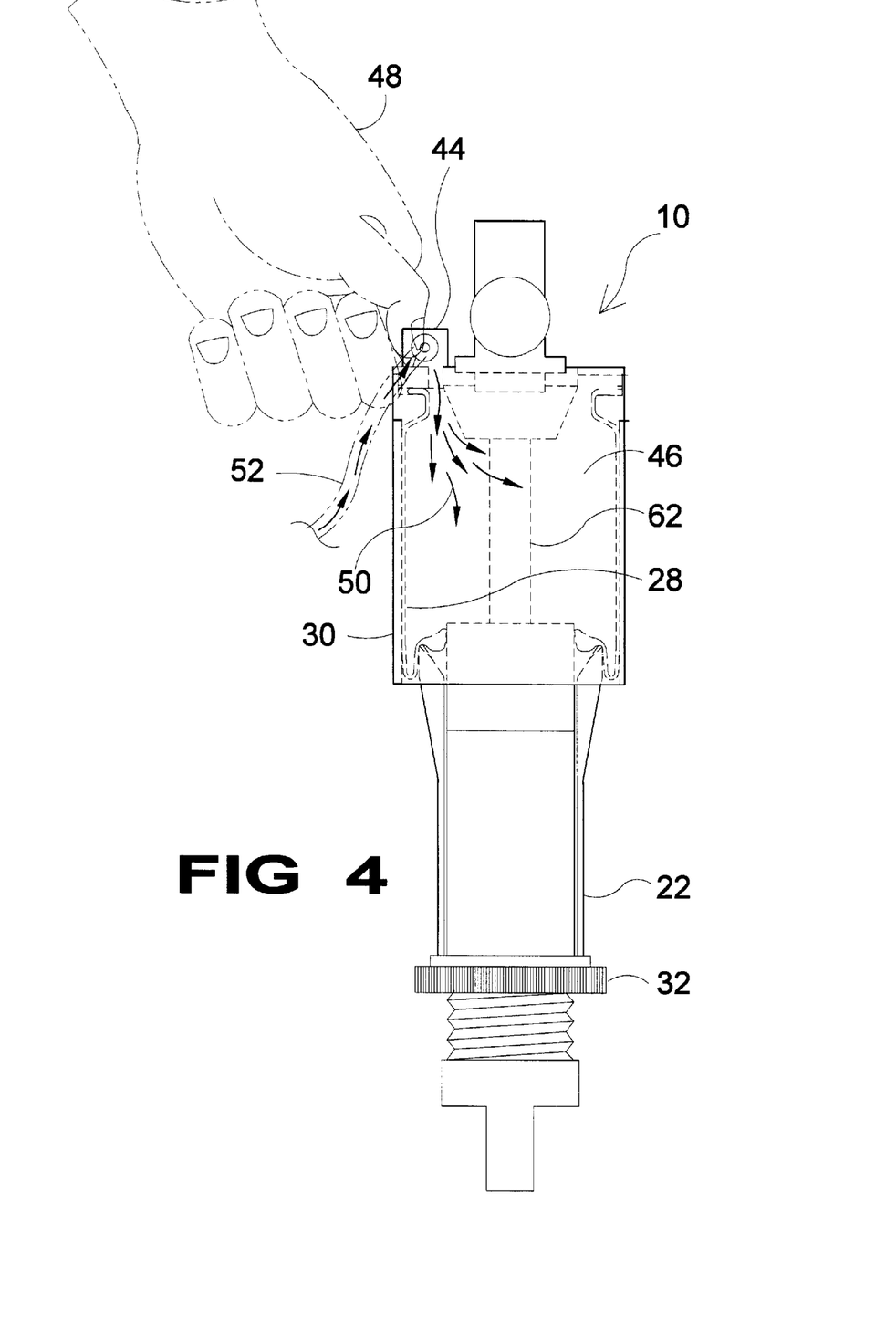
FIG. 4 is a side view of the present invention in use; shown in phantom line is an operator filling the compression chamber with pressurized air from an air compressor. The chamber could be pressurized to varying psi according to the rider's needs. The pressurized air within the chamber maintains the position of the gasket against the casing walls. The present invention could also be pressurized by a manual pump such as the ones cyclists use for their tires.

Turning to FIG. 4, shown therein is a side view of the present invention 10 in use. Shown in phantom line is an operator hand 48 using valve 44 and filling the compression chamber 46 with pressurized air 50 from an air compressor line 52. The chamber 46 could be pressurized to varying psi according to the rider's needs. The pressurized air 50 within the chamber 46 maintains the position of the gasket 28 against the casing walls 30. The present invention 10 could also be pressurized by a manual pump such as the ones cyclists use for their tires. Other elements previously disclosed are also shown.

Figure 5:
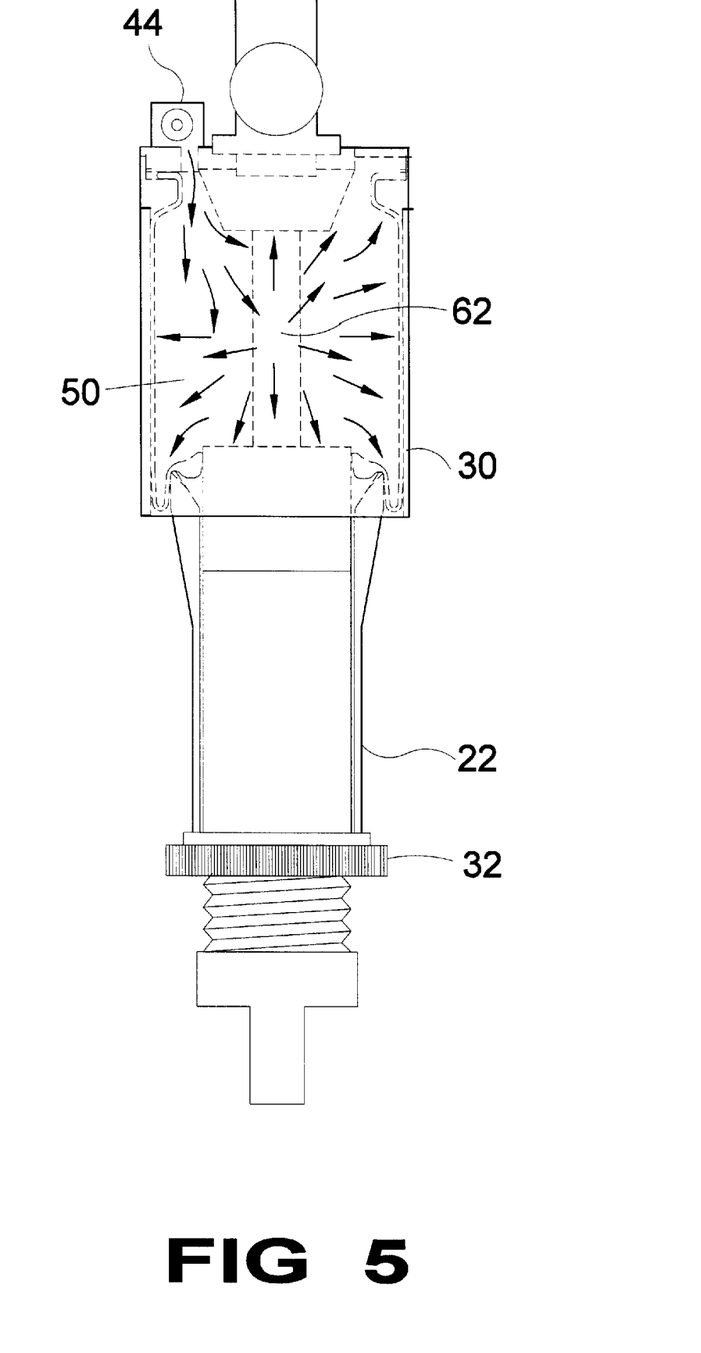
FIG. 5 is a side view of the present invention in a pressurized state. Shown is the present invention pressurized to a specific psi by the operator and in a static condition. The present invention provides the proper amount of sag in the suspension depending on the weight of the rider.

Turning to FIG. 5. shown therein is a side view of the present invention 10 in a pressurized state. Shown is the present invention 10 having pressurized air 50 to a specific psi by the operator and in a static condition. The higher the pressure the harder the ride while a lower pressure provides greater cushioning. Other elements previously disclosed are also shown.

Figure 6:
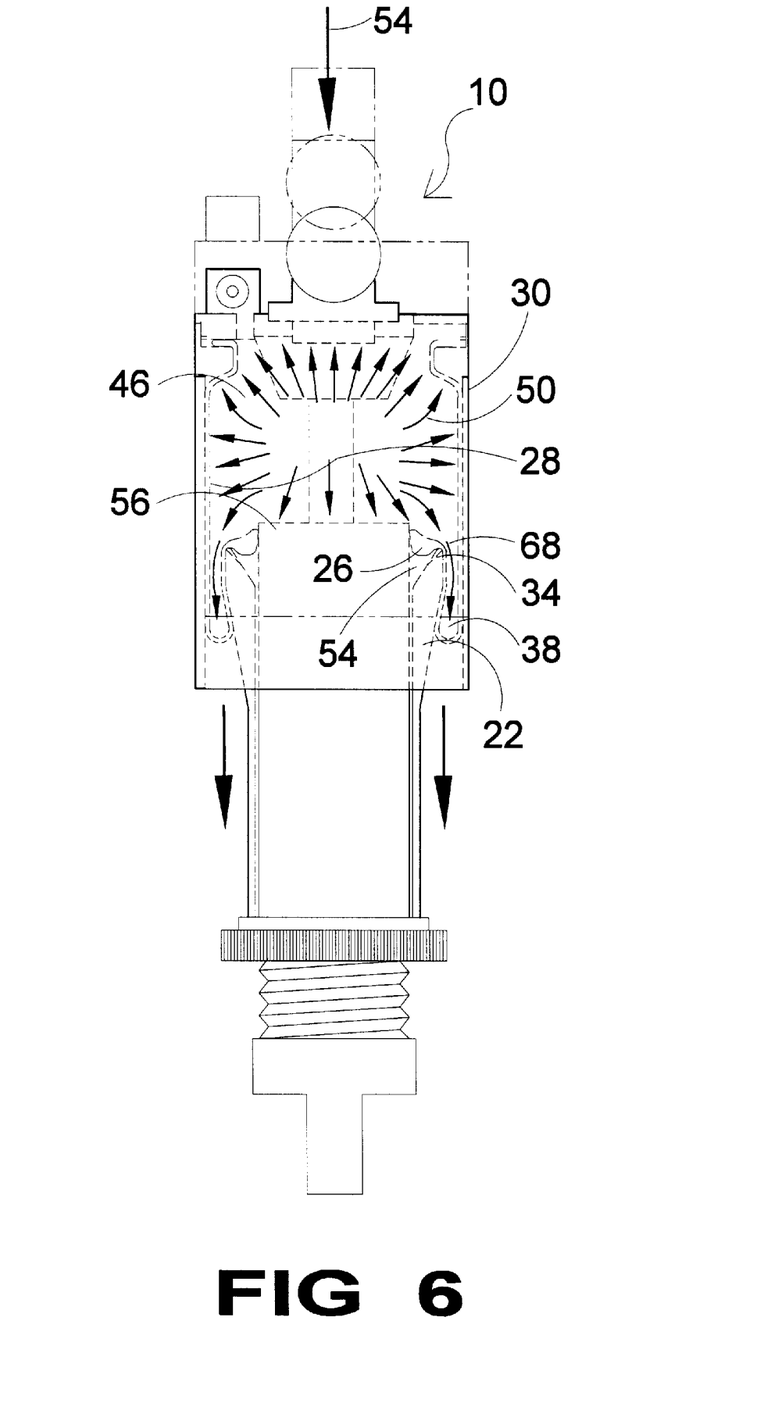

Turning to FIG. 6,. shown therein is a side view of the present invention 10 in use. Shown is a side view of the of an adjustable pneumatic spring assembly with force 54 being applied from the wheel assembly (not shown). The pressurization of air 50 of the chamber 46 forces the compression seal 26 into the graduated recess 54 formed between the mouth 34 of the progression cone 22 and the shock body 56 to create a tighter air seal as the pressure within the chamber 46 increases. When the pressure effected upon the wheel is greater than that within the chamber 46, the shock body 56 is forced into the pressure chamber 46 thereby further compressing the air sealed within the chamber. The shock body 56 travels into the pressure casing 30 and the rubber gasket 28 rolls between the progression cone 22 and the pressure casing 30 to form a pocket 38 interior to the exterior flared portion of the progression cone. The pocket 38 grows progressively larger as the progression cone 22 moves further into the casing 30 and displaces compressed air 50 from the chamber 46 into the resulting lower pocket 38 via the narrow channel 68 between the gasket 28 at the widest point of the progression cone 22 and the gasket 28 alongside the pressure casing 30.

Figure 7:
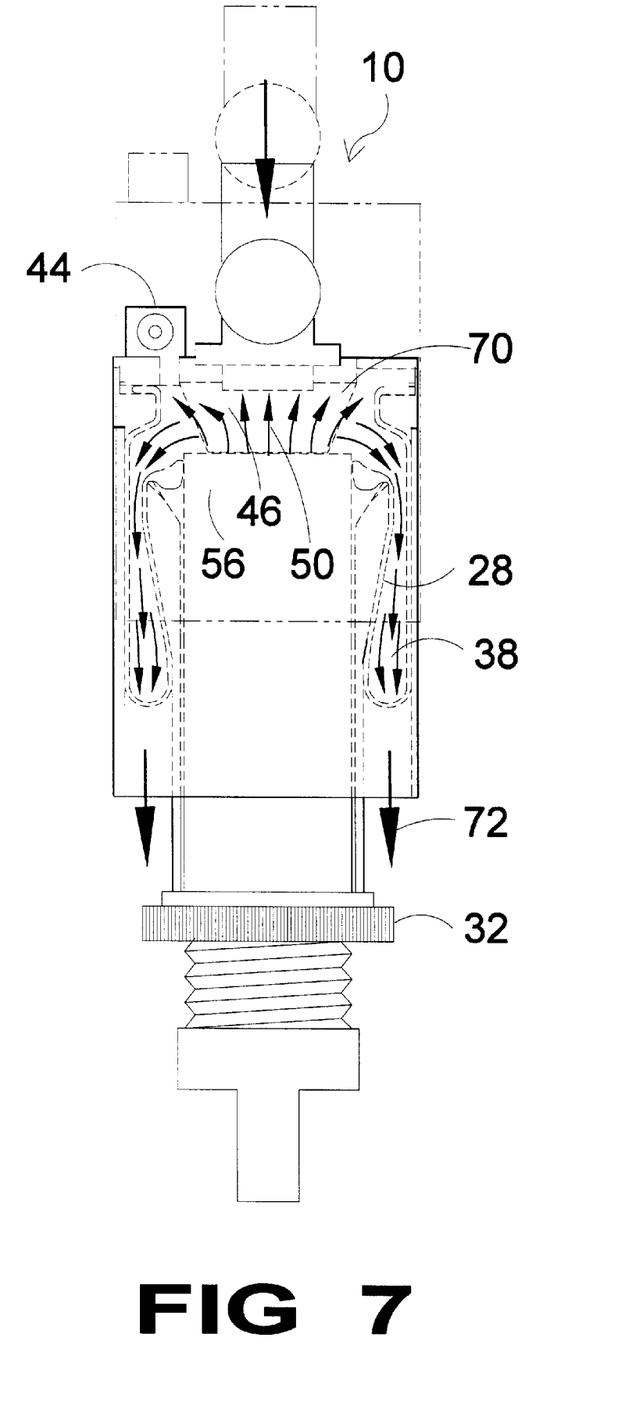
FIG. 7 is a side view of the present invention in use. Shown in hidden line are the interior workings of an adjustable pneumatic spring assembly during maximum compression. The air has been fully compressed and the lower displacement pockets have achieved maximum capacity. The shock body cannot travel any further in the compression chamber because it has contacted the rubber bottom-out bumper.

Turning to FIG. 7, therein is shown is a side view of the present invention 10 in use. Shown in hidden line are the interior workings of an adjustable pneumatic spring assembly during maximum compression. The air 50 has been fully compressed and the lower displacement pockets 38 have achieved maximum capacity. The shock body 56 cannot travel any further into the compression chamber 46 because it has contacted the rubber bottom-out bumper 70. Other elements previously disclosed are also shown.

Figure 8:
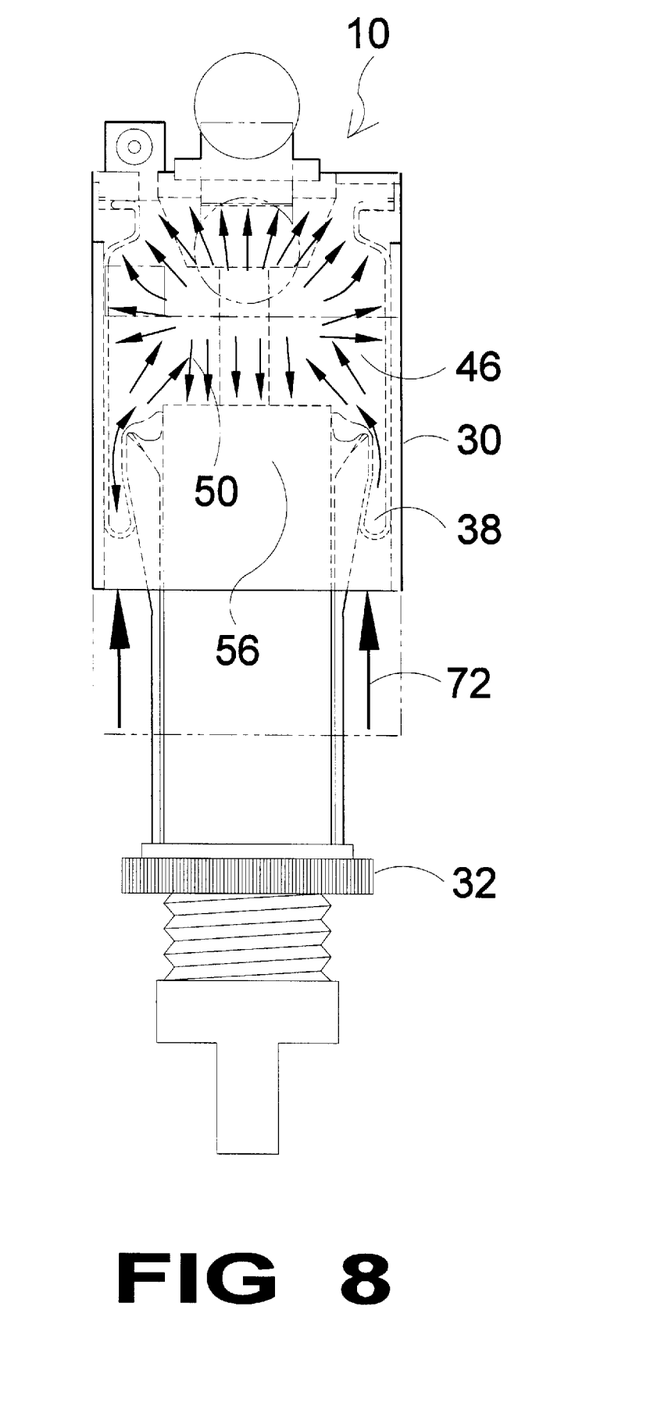
FIG. 8 is a side view of the present invention in use; shown in hidden line are the interior workings of an adjustable pneumatic spring assembly during spring return. Once the pressure exerted upon the wheel member is less than the internal pressure of the pneumatic spring the compressed air expands back to its natural state and the air in the displacement pockets is expelled back into the chamber forcing the shock body back to its preselected position.

Turning to FIG. 8, shown therein is a side view of the present invention 10 in use. Shown in hidden line are the interior workings of an adjustable pneumatic spring assembly during spring return. Once the pressure exerted upon the wheel member is less than the internal pressure of the pneumatic spring the compressed air 50 expands back to its natural state and the air in the displacement pockets 38 is expelled back into the chamber 46 forcing the shock body 56 back to its preselected position as shown by direction arrow 72. Other elements previously disclosed are also shown.

Figure 9:
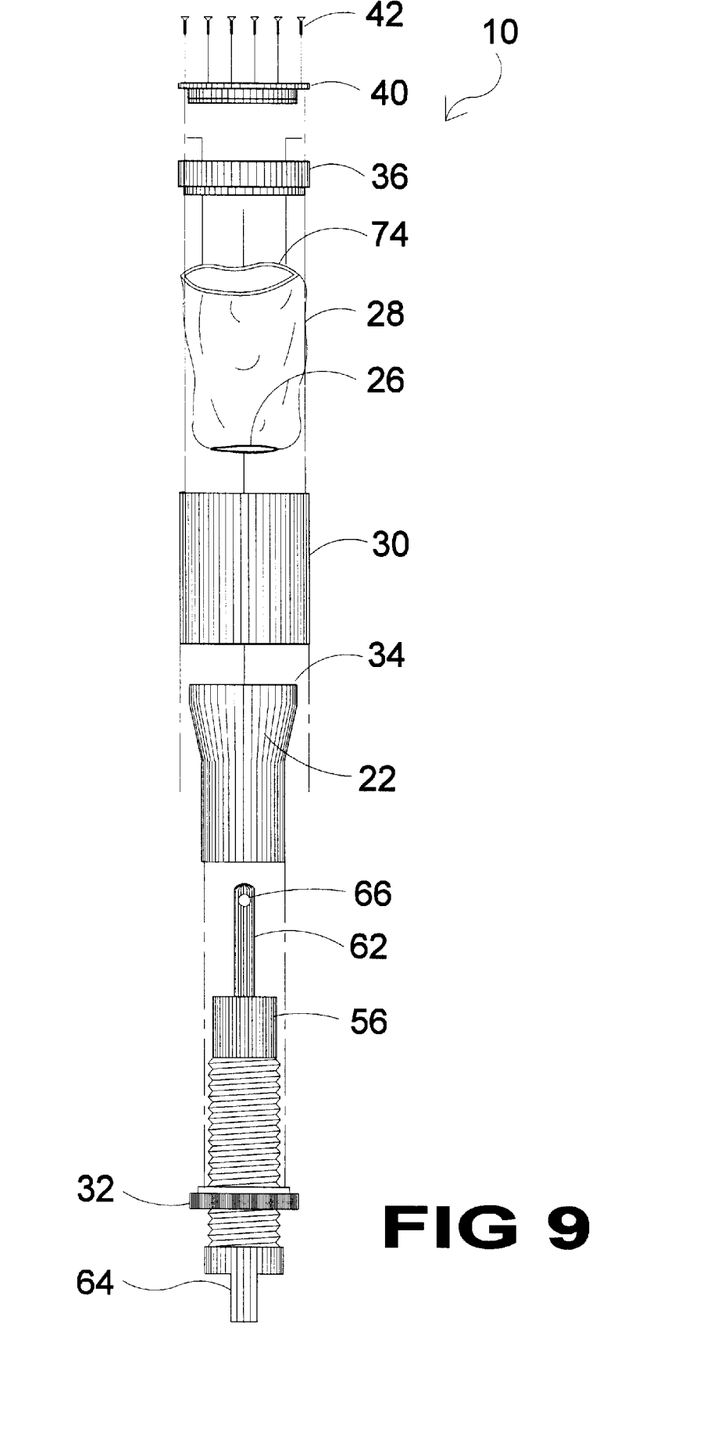
FIG. 9 is an exploded view of the present invention; shown is the shock body and spring preload adjustment nut with the progression cone ready to slide over the shock body and rest upon the adjustment nut. The pressure seal surrounding the lower recess of the rolling gasket gets placed into the gap between the mouth of the progression cone and the shock body while the upper retaining edge of the rolling gasket is to be inserted between the upper and lower retaining plates which are then bolted together and onto the compression casing effectively securing the shock strut. The valve assembly is part of the upper retaining plate.

Turning to FIG. 9, shown therein is an exploded view of the present invention 10. Shown is the shock body 56 with strut 62, means 64, 66 for attachment, and spring preload adjustment nut 32 with the progression cone 22 ready to slide over the shock body 56 and rest upon the adjustment nut 32. The pressure seal 26 surrounding the lower recess of the rolling gasket 28, which is open on each end of its ends, gets placed into the gap between the mouth 34 of the progression cone 22 and the shock body 56 while the upper retaining edge 74 of the sack-like rolling gasket 28 is to be inserted between the upper 40 and lower 36 retaining plates which are then bolted 42 together and onto the compression casing 30 effectively securing the shock strut 62. The valve assembly (not shown) is part of the upper retaining plate. Means 64 is a flange with an aperture therein for receiving a fastener, and means 66 is an aperture in strut 62 for receiving an aperture.

Figure 10:
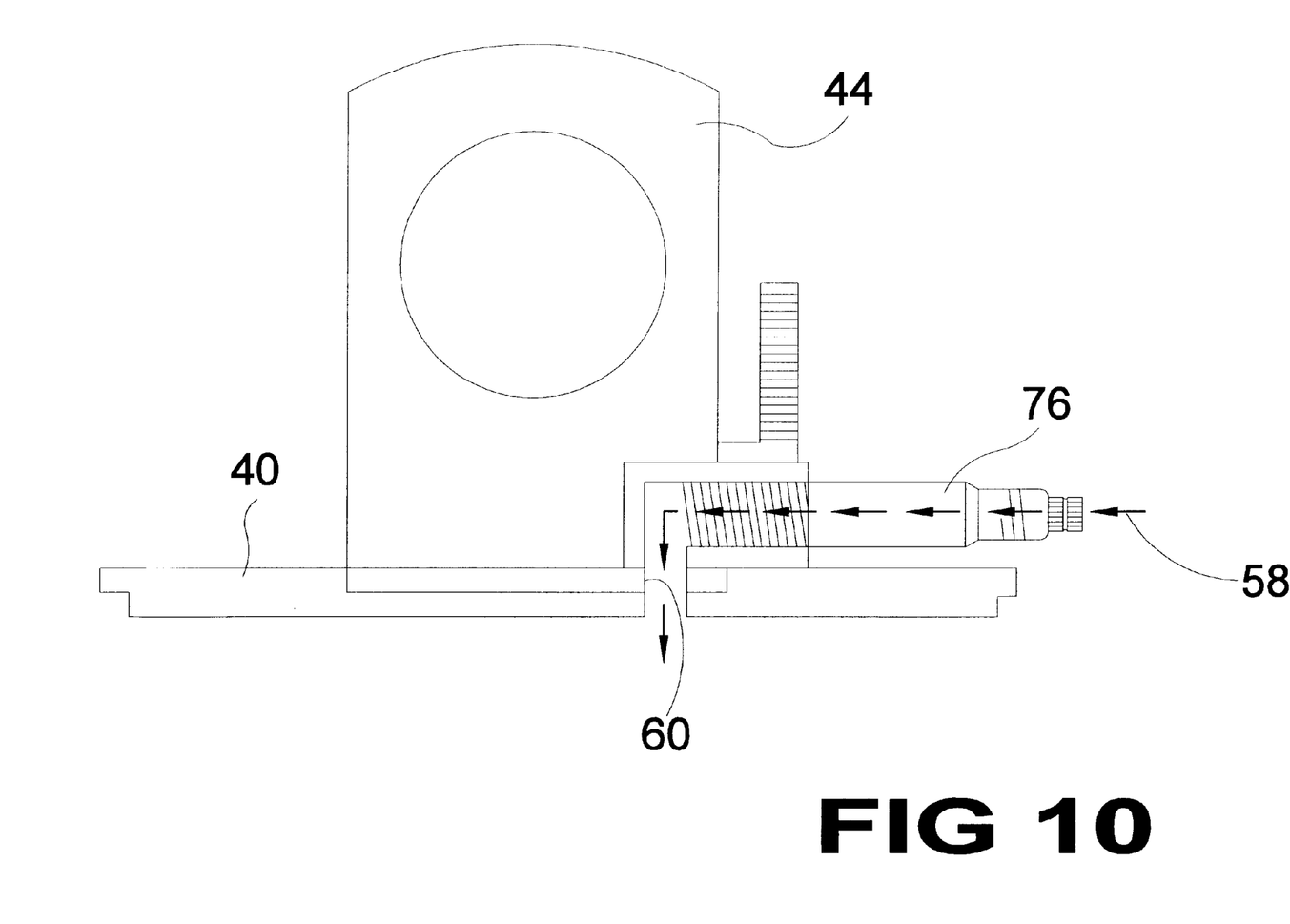
FIG. 10 is a side view of the valve assembly mounted on the upper retaining plate. Shown is air being introduced into a central recess that runs through the upper and lower retaining plates and into the compression chamber located within the pressure casing. The air insertion nozzle of the valve is designed to accommodate either an air compressor fitting or a manual pump.

Turning to FIG. 10, shown therein is a side view of the valve assembly 44 mounted on the upper retaining plate 40. Shown is air 58 being introduced into a central inlet 60 that runs through the upper 40 and lower retaining plates and into the compression chamber located within the pressure casing. The air insertion nozzle of the air inlet valve 76 is designed to accommodate either an air compressor fitting or a manual pump.

What is claimed to be new and desired to be protected by Letters Patent is set forth in the appended claims:

I claim:

1. A shock absorbing member for attachment to the frame of a bicycle, comprising:
   a) a cylindrically shaped, generally upright standing central body member;
   b) said central body member having a shock absorbing mechanism disposed on its interior, said shock absorbing body having a strut on its upper end;
   c) a first means for attaching said central body member to the frame of a bicycle disposed on the lower end of said central body member;
   d) a second means for attaching said strut to the frame of a bicycle disposed on the upper end of said strut;
   e) means for a pneumatic dampener disposed external to said central body member whereby the load of the bicycle is secondarily dampened;
   f) threads disposed on the exterior of said central body member;
   g) an adjustment nut threadably mated to the exterior of said threads;
   h) said first means for attaching said central body to the bicycle frame further comprising a flange having a first aperture therein for receiving a fastener;
   i) said second means for attaching said strut to the bicycle frame further comprising said strut having a second aperture therein for receiving a fastener; and
   j) said means for a pneumatic dampener further comprising a progression cone disposed about the exterior of said central body member, said progression cone having a lower end and an enlarged upper rim portion, the lower end of said progression cone communicating with said adjustment nut.

2. The apparatus of claim 1, further comprising a pressure casing disposed about said enlarged upper rim portion of said progression cone.

3. The apparatus of claim 2, further comprising a flexible gasket having a sack-like shape, said gasket open on each end, said gasket having a lower end and an upper end, said lower end of said gasket further comprising means for a compression seal disposed about the upper end of said central body member.

4. The apparatus of claim 3, said means for a compression gasket disposed between said upper end of said central body member and said enlarged upper rim portion of said progression cone whereby said means for a compression gasket forms an airtight seal about said upper end of said central body member.

5. The apparatus of claim 4, further comprising said pressure casing having an upper and a lower end, said upper end of said pressure casing further comprising an upper and a lower retaining plate disposed thereon.

6. The apparatus of claim 5, further comprising said upper end of said gasket disposed between said upper and said lower retaining plate, said gasket thereby disposed on the interior of said pressure casing, said gasket forming an airtight pressure chamber on the interior of said pressure casing.

7. The apparatus of claim 6, further comprising a shock absorbing bumper disposed on the upper interior end of said pressure cylinder.

8. The apparatus of claim 7, further comprising means for an air inlet disposed on the upper end of said pressure cylinder whereby atmospheric air can be inlet into said pressure chamber.

* * * * *